United States Patent
Pingenot

(10) Patent No.: US 9,633,311 B2
(45) Date of Patent: Apr. 25, 2017

(54) DECISION TREE LEARNING

(71) Applicant: SAS Institute Inc., Cary, NC (US)

(72) Inventor: Joseph Albert F. S. Pingenot, Fuquay Varina, NC (US)

(73) Assignee: SAS Institute Inc., Cary, NC (US)

( * ) Notice: Subject to any disclaimer, the term of this patent is extended or adjusted under 35 U.S.C. 154(b) by 375 days.

(21) Appl. No.: 14/314,517

(22) Filed: Jun. 25, 2014

(65) Prior Publication Data

US 2015/0012465 A1     Jan. 8, 2015

Related U.S. Application Data

(60) Provisional application No. 61/842,464, filed on Jul. 3, 2013, provisional application No. 61/844,854, filed on Jul. 10, 2013.

(51) Int. Cl.
G06N 5/02 (2006.01)

(52) U.S. Cl.
CPC .................. *G06N 5/025* (2013.01)

(58) Field of Classification Search
None
See application file for complete search history.

(56) References Cited

U.S. PATENT DOCUMENTS

| | | |
|---|---|---|
| 5,187,330 A | 2/1993 | Holcroft |
| 5,754,614 A | 5/1998 | Wingen |

FOREIGN PATENT DOCUMENTS

WO    WO 0067194    11/2000

OTHER PUBLICATIONS

Peter Turney, Cost-Sensitive Classification: Empirical Evaluation of a Hybrid Genetic Decision Tree Induction Algorithm, Mar. 1995, Journal of Artificial Intelligence Research 2, pp. 369-409.*
de Ville et al., Chapter 1 Decision Trees—What Are They?, Decision Trees for Analytics Using SAS® Enterprise Miner™, Jul. 2013, SAS Institute Inc., Cary, North Carolina, pp. 1-14.
P. Neville, Decision Trees for Predictive Modeling, Aug. 4, 1999, Downloaded from https://datamining.bus.utk.edu/Documents/Decision-Trees-for-Predictive-Modeling-(Neville).pdf on Feb. 18, 2014, pp. 1-24.
Barlow et al., Case Study: Visualization for Decision Tree Analysis in Data Mining, 2001 IEEE Symposium on Information Visualization, San Diego, CA , Oct. 22, 2001.
A. Cathie, The Anti-Curse: Creating an Extension to SAS® Enterprise Miner™ Using Proc Arboretum, SAS Global Forum 2011, Data Mining and Text Analytics, Paper 155-2011, Mar. 14, 2011, pp. 1-11.
Wu et al., An Improving Scheme of Unranking t-ary Trees in Gray-code Order, International Conference on Mechanical, Production and Materials Engineering (ICMPME'2012), Bangkok, Jun. 16, 2012, pp. 48-53.
C. Savage, A Survey of Combinatorial Gray Codes, SIAM Review, vol. 39, Issue 4, Dec. 1997, pp. 605-629.
Algorithms, Communications of the ACM, L.D. Fosdick, Editor, vol. 13, No. 6, Jun. 1970, pp. 368-376.

(Continued)

*Primary Examiner* — Alan Chen
(74) *Attorney, Agent, or Firm* — Bell & Manning, LLC

(57) ABSTRACT

A method of generating a decision tree is provided. A leaf assignment for each proposed split in generating the decision tree is incremented using a Gray code.

30 Claims, 11 Drawing Sheets

(56) References Cited

OTHER PUBLICATIONS

The Arboretum Procedure (Date Unknown) pp. 1-76.
Gray code, Downloaded from http://en.wikipedia.org/wiki/Gray_code on Oct. 23, 2013, pp. 1-16.
SAS/STAT(R) 12.3 User's Guide: High-Performance Procedures—Syntax, Downloaded from http://support.sas.com/documentation/cdl/en/stathpug/66410/HTML/default/viewer.htm#titlepage.htm on Oct. 23, 2013, pp. 1-4.
SAS/STAT(R) 12.3 User's Guide: High-Performance Procedures—Overview, Downloaded from http://support.sas.com/documentation/cdl/en/stathpug/66410/HTML/default/viewer.htm#titlepage.htm on Oct. 23, 2013, pp. 1-4.
Eades et al., Some Hamilton Paths and a Minimal Change Algorithm , Journal of the Association for Computing Machinery, vol. 31, No. 1, Jan. 1984, pp. 19-29.
The SPLIT Procedure, Copyright 2000 by SAS Institute Inc., Cary, NC, USA.
rf-ace—Decision Tree Ensemble Learning—Google Project Hosting, Downloaded from https://code.google.com/p/rf-ace/ on Nov. 8, 2013, pp. 1-5.
de Ville et al., Chapter 2 Descriptive, Predictive, and Explanatory Analyses, Decision Trees for Analytics Using SAS® Enterprise Miner™, Jun. 2013, SAS Institute Inc., Cary, North Carolina, pp. 43-49.
de Ville et al., Chapter 5 Theoretical Issues in the Decision Tree Growing Process, Decision Trees for Analytics Using SAS® Enterprise Miner™, Jun. 2013, SAS Institute Inc., Cary, North Carolina, Jun. 2013, pp. 146-159.
de Ville et al., Chapter 6 The Integration of Decision Trees with Other Data Mining Approaches, Decision Trees for Analytics Using SAS® Enterprise Miner™, Jun. 2013, SAS Institute Inc., Cary, North Carolina, Jun. 2013, pp. 200-217.

\* cited by examiner ical and analytical decision support tool, where the expected values (or expected utility) of competing alternatives are calculated. Decision tree learning uses a decision tree as a predictive model, which maps observations about an item to conclusions about the item's target value. More descriptive names for such decision tree models are classification trees or regression trees.

SUMMARY

In an example embodiment, a method of generating a decision tree is provided. A target indicator of a target variable to evaluate from a dataset is received. An input indicator of an input variable to evaluate from the dataset is received. The dataset includes a plurality of values of the input variable and a plurality of target values of the target variable. A value of the input variable is associated with a target value of the target variable. A number of levels of the input variable to evaluate is determined. A level value for each of the determined number of levels is defined based on the plurality of values of the input variable. The plurality of values of the input variable are assigned to a level of the determined number of levels based on the defined level value. A maximum number of leaves of a plurality of leaves to evaluate is identified. The identified maximum number of leaves is less than or equal to the determined number of levels. A leaf assignment value for each level of the determined number of levels is defined. The leaf assignment value is less than or equal to the identified maximum number of leaves. A decision metric for splitting data in the dataset based on the defined leaf assignment value and the assigned plurality of values of the input variable is computed. The defined leaf assignment value and the computed decision metric are stored. A leaf assignment of the determined number of levels is incremented using a Gray code to define the leaf assignment value for each level of the determined number of levels. The leaf assignment value for each level varies between zero and the identified maximum number of leaves. For each leaf assignment possibility of the determined number of levels, the leaf assignment value is defined and the decision metric is computed and stored. A best leaf assignment for the plurality of values of the input variable and the plurality of target values of the target variable is selected based on the calculated decision metric.

In another example embodiment, a computer-readable medium is provided having stored thereon computer-readable instructions that, when executed by a computing device, cause the computing device to perform the method of generating a decision tree.

In yet another example embodiment, a system is provided. The system includes, but is not limited to, a processor and a computer-readable medium operably coupled to the processor. The computer-readable medium has instructions stored thereon that, when executed by the computing device, cause the computing device to perform the method of generating a decision tree.

Other principal features of the disclosed subject matter will become apparent to those skilled in the art upon review of the following drawings, the detailed description, and the appended claims.

BRIEF DESCRIPTION OF THE DRAWINGS

Illustrative embodiments of the disclosed subject matter will hereafter be described referring to the accompanying drawings, wherein like numerals denote like elements.

DETAILED DESCRIPTION

A decision tree is a decision support tool that uses a tree-like graph or model of decisions and their possible consequences. A decision tree is a flowchart-like structure in which an internal node represents a test on an attribute value, each branch represents an outcome of the test, and each leaf node represents a class label, which represents the decision taken after following the outcome of each test to the leaf node. A path from root node to leaf node may represent a classification rule.

In decision analysis, a decision tree can be used to visually and explicitly represent decisions and decision making. In data mining, a decision tree describes data, but not decisions; rather, the resulting decision tree can be an input for decision making.

The goal in decision tree learning is to create a model that predicts the value of a target variable based on a value of an attribute associated with one or more input variables. Each leaf represents a value of the target variable given the values of the input variables represented by the path from the root node to the leaf node. A dataset for which a model is to be determined may be stored as a plurality of records in the form: (x, Y)=($x_1$, $x_2$, . . . , $x_k$, Y), where the dependent variable, Y, is the target variable for which the model is being created. The vector x is composed of the input variables, $x_1$, $x_2$, . . . , $x_k$, that are used to model the determination of Y. The value associated with each input variable for a given record defines the attributes for that record.

A tree can be "learned" by splitting the source dataset into two or more subsets based on a test of the attribute value of a specific variable. This process is repeated on each derived subset in a recursive manner called recursive partitioning. The recursion is completed when the subset at a node has all the same value of the target variable, when splitting no longer increases an estimated value of the prediction, when a specific depth of the decision tree is reached, etc. Algorithms for constructing decision trees (decision tree learning) usually work top-down by choosing a variable at each step that best splits the set of items. Different algorithms use different metrics for measuring the "best" split. The metrics generally provide a measure of the homogeneity of the target variable within the subsets based on the variable's value. The metrics are calculated for each candidate subset at each level, and the resulting metric values are combined (e.g., averaged) to provide a measure of the quality of the split.

Figure 7:
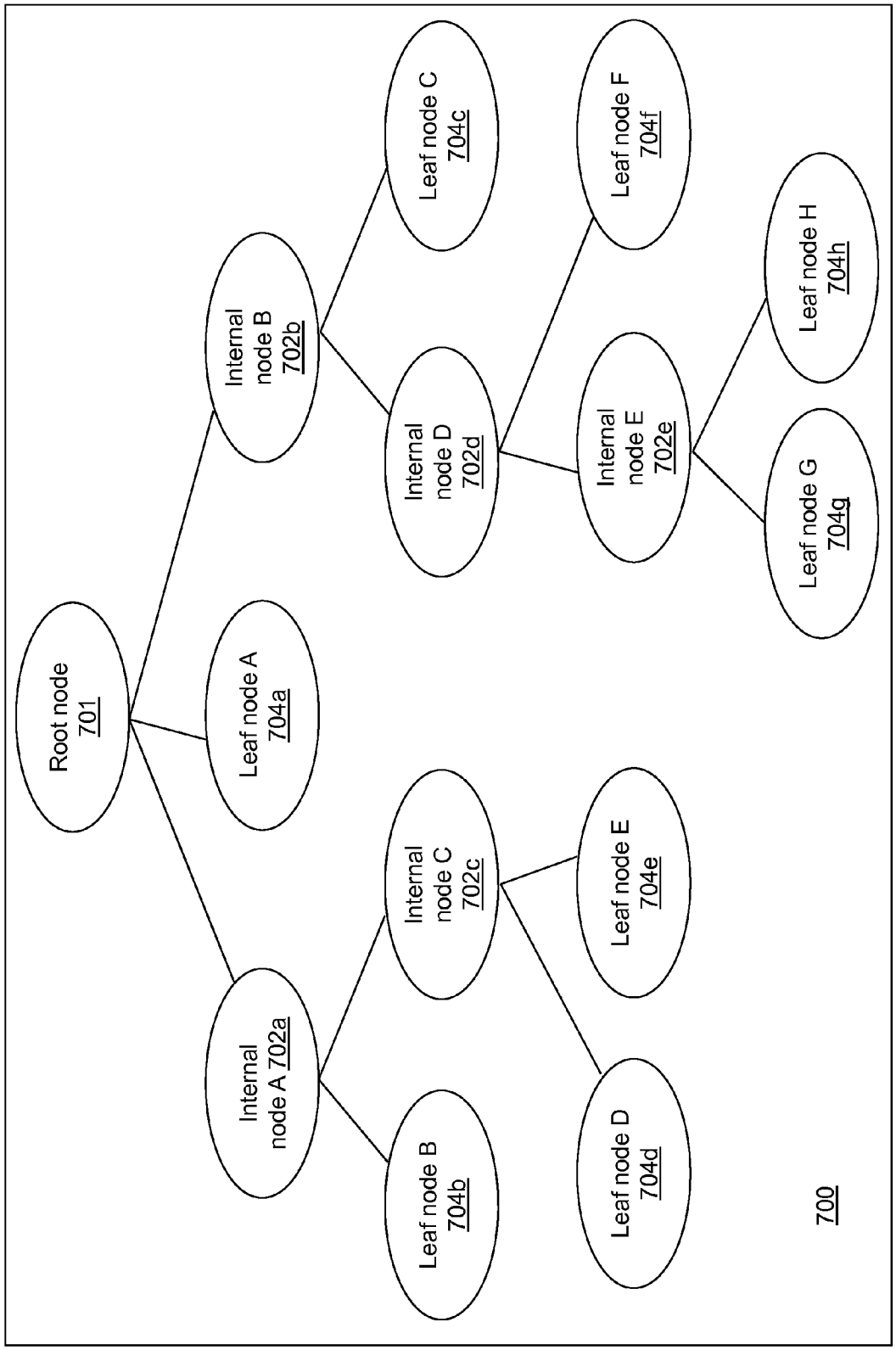
FIG. 7 depicts an example decision tree in accordance with an illustrative embodiment.

For example, referring to FIG. 7, a decision tree 700 is shown in accordance with an illustrative embodiment. Decision tree 700 may include a root node 701, one or more internal nodes, and a plurality of leaf nodes. In the illustrative embodiment, the one or more internal nodes include a first internal node A 702a, a second internal node B 702b, a third internal node C 702c, a fourth internal node D 702d, and a fifth internal node E 702e. In the illustrative embodiment, the plurality of leaf nodes include a first leaf node A 704a, a second leaf node B 704b, a third leaf node C 704c, a fourth leaf node D 704d, a fifth leaf node E 704e, a sixth leaf node F 704f, a seventh leaf node G 704g, and an eighth leaf node H 704h. First internal node A 702a, first leaf node A 704a, and second internal node B 702b are created from a first split of the dataset that is being analyzed to form decision tree 700. The first split is associated with three tests based on different values or ranges of values for the first attribute. For example, if the dataset includes a variable "age", the attribute is the age associated with each record. First internal node A 702a, first leaf node A 704a, and second internal node B 702b define a specific age range. For example, the split may define first internal node A 702a as age<50, may define first leaf node A 704a as age>=100, and may define second internal node B 702b as 50<=age<100. Leaf node A 704a may define a leaf node because a value of the target variable is the same for each record for which the age attribute is >=100. Thus, no further split is needed.

If the dataset includes a variable "income", the attribute is the income associated with each record. Third internal node C 702c and second leaf node B 704b define a specific income range. For example, the split may define third internal node C 702c as income>=$100,000 and may define second leaf node B 704b as income<$100,000.

If the dataset includes a variable "occupation", the attribute is the occupation associated with each record. Fourth internal node D 702d and third leaf node C 704c define specific occupations. For example, the split may define third leaf node C 704c as the occupation of engineer and may define fourth internal node D 702d as any other occupation.

Numerous decision tree learning algorithms exist, including the iterative dichotomiser 3 (ID3) tree-generation algorithm, the chi-squared automatic interaction detector (CHAID) tree-generation algorithm, the C4.5 tree-generation algorithm, the C5.0 tree-generation algorithm, the classification and regression trees (CART) tree-generation algorithm, the multivariate adaptive regression splines (MARS) tree-generation algorithm, etc. as understood by a person of skill in the art. In some algorithms, such as the ID3 algorithm, root node 701 includes the original dataset. On each iteration, the algorithm iterates through every unused variable of the dataset and calculates the entropy, or information gain, of that variable. The variable having the smallest entropy, or largest information gain, value is selected for that split (i.e., age, income, occupation). The dataset is then split by the selected variable (i.e., age<50, 50<=age<100, age>=100) to produce subsets of the dataset. The algorithm continues to recurse on each subset considering only variables not selected previously. In some tree-generation algorithms, the decision metric (e.g., entropy) having the largest value defines the variable on which to split the dataset. In some tree-generation algorithms, a further split of the same variable may be used for a subsequent split.

Figure 1:
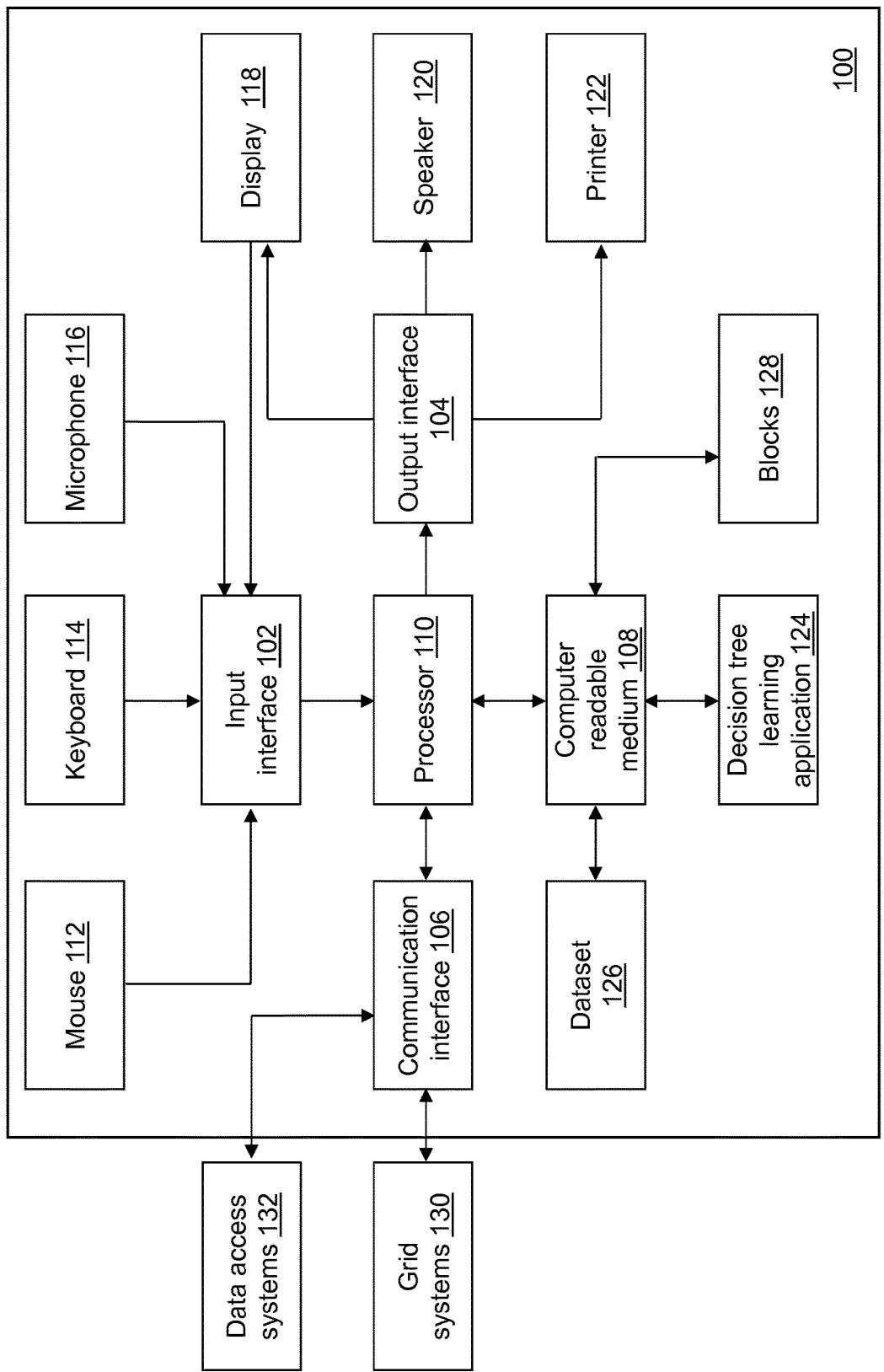
FIG. 1 depicts a block diagram with an example of a decision tree learning device in accordance with an illustrative embodiment.

Referring to FIG. 1, a block diagram of a decision tree learning device 100 is shown in accordance with an illustrative embodiment. Decision tree learning device 100 may include an input interface 102, an output interface 104, a communication interface 106, a computer-readable medium 108, a processor 110, a decision tree learning application 124, a dataset 126, and a plurality of blocks 128. Fewer, different, and/or additional components may be incorporated into decision tree learning device 100.

Input interface 102 provides an interface for receiving information from the user for entry into decision tree learning device 100 as understood by those skilled in the art. Input interface 102 may interface with various input technologies including, but not limited to, a mouse 112, a keyboard 114, a microphone 116, a display 118, a track ball, a keypad, one or more buttons, etc. to allow the user to enter information into decision tree learning device 100 or to make selections presented in a user interface displayed on display 118. The same interface may support both input interface 102 and output interface 104. For example, a touch screen display both allows user input and presents output to the user. Decision tree learning device 100 may have one or more input interfaces that use the same or a different input interface technology. The input interface technology further may be accessible by decision tree learning device 100 through communication interface 106.

Output interface 104 provides an interface for outputting information for review by a user of decision tree learning device 100. For example, output interface 104 may interface with various output technologies including, but not limited to, display 118, a speaker 120, a printer 122, etc. Decision tree learning device 100 may have one or more output interfaces that use the same or a different output interface technology. The output interface technology further may be accessible by decision tree learning device 100 through communication interface 106.

Communication interface 106 provides an interface for receiving and transmitting data between devices using various protocols, transmission technologies, and media as understood by those skilled in the art. Communication interface 106 may support communication using various transmission media that may be wired and/or wireless. Decision tree learning device 100 may have one or more communication interfaces that use the same or a different communication interface technology. For example, decision tree learning device 100 may support communication using an Ethernet port, a Bluetooth® antenna, a telephone jack, a universal serial bus (USB) port, etc. Data and messages may be transferred between decision tree learning device 100 and grid systems 130 using communication interface 106.

Computer-readable medium 108 is an electronic holding place or storage for information so the information can be accessed by processor 110 as understood by those skilled in the art. Computer-readable medium 108 can include, but is not limited to, any type of random access memory (RAM), any type of read only memory (ROM), any type of flash memory, etc. such as magnetic storage devices (e.g., hard disk, floppy disk, magnetic strips, . . . ), optical disks (e.g., compact disc (CD), digital versatile disc (DVD), . . . ), smart cards, flash memory devices, etc. Decision tree learning device 100 may have one or more computer-readable media that use the same or a different memory media technology. Decision tree learning device 100 also may have one or more drives that support the loading of a memory media such as a CD, DVD, an external hard drive, etc. One or more external memory drives further may be connected to decision tree learning device 100 using communication interface 106.

Processor 110 executes instructions as understood by those skilled in the art. The instructions may be carried out by a special purpose computer, logic circuits, or hardware circuits. Processor 110 may be implemented in hardware and/or firmware. Processor 110 executes an instruction, meaning it performs/controls the operations called for by that instruction. The term "execution" is the process of running an application or the carrying out of the operation called for by an instruction. The instructions may be written using one or more programming language, scripting language, assembly language, etc. Processor 110 operably couples with input interface 102, with output interface 104, with communication interface 106, and with computer-readable medium 108 to receive, to send, and to process information. Processor 110 may retrieve a set of instructions from a permanent memory device and copy the instructions in an executable form to a temporary memory device that is generally some form of RAM. Decision tree learning device 100 may include a plurality of processors that use the same or a different processing technology.

Decision tree learning application 124 performs operations associated with decision tree generation from data stored in dataset 126. Some or all of the operations described herein may be embodied in decision tree learning application 124. The operations may be implemented using hardware, firmware, software, or any combination of these methods. Referring to the example embodiment of FIG. 1, decision tree learning application 124 is implemented in software (comprised of computer-readable and/or computer-executable instructions) stored in computer-readable medium 108 and accessible by processor 110 for execution of the instructions that embody the operations of decision tree learning application 124. Decision tree learning application 124 may be written using one or more programming languages, assembly languages, scripting languages, etc.

Decision tree learning application 124 may be implemented as a Web application. For example, decision tree learning application 124 may be configured to receive hypertext transport protocol (HTTP) responses and to send HTTP requests. The HTTP responses may include web pages such as hypertext markup language (HTML) documents and linked objects generated in response to the HTTP requests. Each web page may be identified by a uniform resource locator (URL) that includes the location or address of the computing device that contains the resource to be accessed in addition to the location of the resource on that computing device and parameters to control its operation. The type of file or resource depends on the Internet application protocol such as the file transfer protocol, HTTP, H.323, etc. The file accessed may be a simple text file, an image file, an audio file, a video file, an executable, a common gateway interface application, a Java applet, an extensible markup language (XML) file, or any other type of file supported by HTTP.

Dataset 126 includes a plurality of rows and a plurality of columns. The rows of dataset 126 may be referred to as observations and the columns associated with an observation may be referred to as attributes of the observation for the associated variables. Of course, in an alternative embodiment, dataset 126 may be transposed. As discussed previously, dataset 126 may be stored as a plurality of records in the form $(x, Y)=(x_1, x_2, \ldots, x_k, Y)$, where the dependent variable, Y, is the target variable for which the model is being created. The vector x is composed of the input variables, $x_1, x_2, \ldots, x_k$, that are used to model the determination of Y. The target variable Y can be any of the plurality of columns. Decision tree learning application 124 may use one or more of the input variables, $x_1, x_2, \ldots, x_k$, to generate a decision tree for dataset 126.

The data stored in dataset 126 may include any type of content represented in any computer-readable format such as binary, alphanumeric, numeric, string, markup language, etc. The content may include textual information, graphical information, image information, audio information, numeric information, etc. that further may be encoded using various encoding techniques as understood by a person of skill in the art. Dataset 126 may be stored in computer-readable medium 108 or on one or more other computing devices and accessed using communication interface 106. For example, dataset 126 may be stored in a cube distributed across grid systems 130 as understood by a person of skill in the art. Dataset 126 may be stored using various formats as known to those skilled in the art including a file system, a relational database, a system of tables, a structured query language database, etc.

Figure 3:
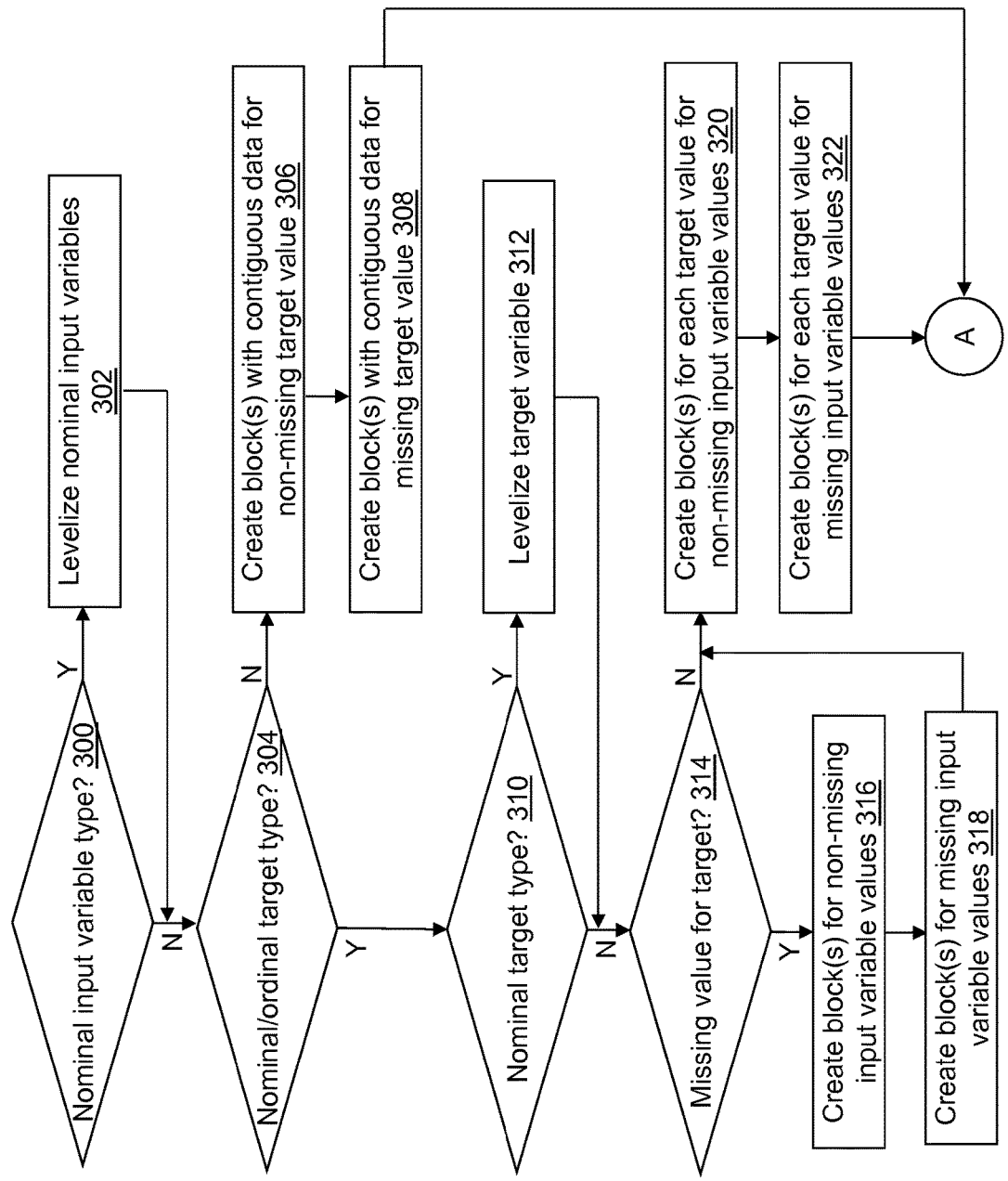
FIG. 3 depicts a flow diagram illustrating further examples of operations performed by the decision tree learning device of FIG. 1 in accordance with an illustrative embodiment.

The plurality of blocks 128 are created from all or a portion of dataset 126, for example, as discussed with reference to FIG. 3. In an illustrative embodiment, dataset 126 may be stored in a ROM type memory, and the plurality of blocks 128 may be stored in a RAM type memory.

Figure 2:
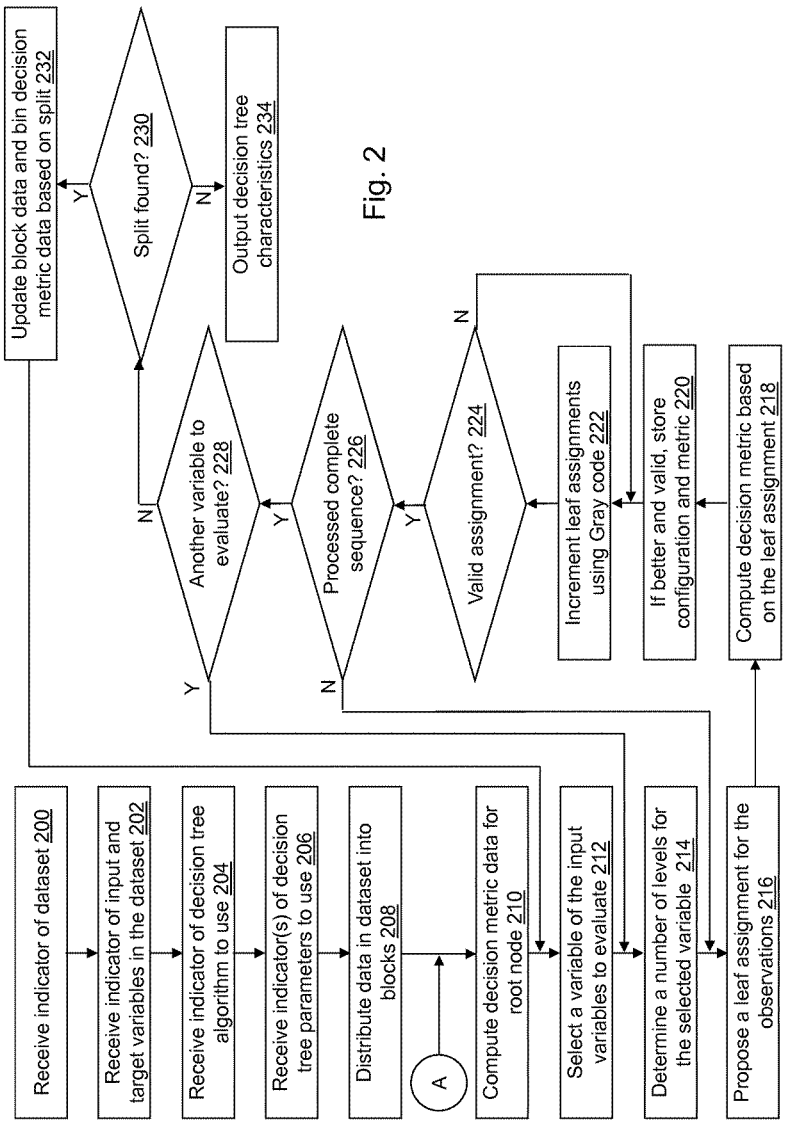
FIG. 2 depicts a flow diagram illustrating examples of operations performed by the decision tree learning device of FIG. 1 in accordance with an illustrative embodiment.

Referring to FIG. 2, example operations associated with decision tree learning application 124 are described. Additional, fewer, or different operations may be performed depending on the embodiment. The order of presentation of the operations of FIG. 2 is not intended to be limiting. Although some of the operational flows are presented in sequence, the various operations may be performed in various repetitions, concurrently (in parallel, for example, using threads), and/or in other orders than those that are illustrated. For example, a user may execute decision tree learning application 124, which causes presentation of a first user interface window, which may include a plurality of menus and selectors such as drop down menus, buttons, text boxes, hyperlinks, etc. associated with decision tree learning application 124 as understood by a person of skill in the art. As used herein, an indicator indicates one or more user selections from a user interface, one or more data entries into a data field of the user interface, one or more data items read from computer-readable medium 108 or otherwise defined with one or more default values, etc.

In an operation 200, a first indicator of data for which to generate a decision tree is received. For example, the first indicator indicates a location of dataset 126. The location may include a filename. As an example, the first indicator may be received by decision tree learning application 124 after selection from a user interface window or after entry by a user into a user interface window. In an alternative embodiment, the data to cluster may not be selectable. For example, a most recently created data set may be used automatically as dataset 126.

In an operation 202, a second indicator indicating one or more input variables (columns of data) and a target variable to be used to generate the decision tree is received. A subset of the input variables (columns of data) stored in dataset 126 may be identified by the user. Additionally, one or more subsets of dataset 126 may be defined for creating a training subset, a validation subset, and/or a test subset. The second indicator may indicate a number of observations to include, a percentage of observations of the entire dataset to include, etc., in whichever type of subset is being created. A subset may be created from dataset 126 by sampling. An example sampling algorithm is uniform sampling. Other random sampling algorithms may be used. In an alternative embodiment, the variables may not be selectable. For example, a last column may be used automatically as the target variable and the one or more input variables are the remaining columns of data in dataset 126.

In an operation 204, a third indicator of a decision tree learning algorithm to use to generate the decision tree is received. For example, the third indicator indicates a name of a decision tree learning algorithm. The third indicator may be received by decision tree learning application 124 after selection from a user interface window or after entry by a user into a user interface window. A default value for the decision tree learning algorithm to execute may further be stored, for example, in computer-readable medium 108. In an alternative embodiment, the decision tree learning algorithm may not be selectable.

In an operation 206, a fourth indicator of one or more decision tree parameters is received. For example, the fourth indicator may indicate a maximum depth of the decision tree, a threshold worth value, a minimum number of observations per leaf node, etc. The fourth indicator may be received by decision tree learning application 124 after selection from a user interface window or after entry by a user into a user interface window. Default values for the one or more decision tree parameters may further be stored, for example, in computer-readable medium 108. In an alternative embodiment, the one or more decision tree parameters may not be selectable and may be stored in computer-readable medium 108, for example, for all decision tree learning algorithms or in association with a specific decision tree learning algorithm.

In an operation 208, data in dataset 126 (or a subset of dataset 126) is distributed into the plurality of blocks 128. Referring to FIG. 3, example operations associated with distributing the data in dataset 126 into the plurality of blocks 128 are described. Additional, fewer, or different operations may be performed depending on the embodiment. The order of presentation of the operations of FIG. 3 is not intended to be limiting. Although some of the operational flows are presented in sequence, the various operations may be performed in various repetitions, concurrently (in parallel, for example, using threads), and/or in other orders than those that are illustrated.

In an operation 300, a determination is made concerning whether or not any of the input variable(s) are of the nominal data type. Data of the nominal data type is categorically discrete data such as a name of an entity, a type of car, a title, etc. If an input variable is of the nominal data type, processing continues in an operation 302. If none of the input variable(s) are of the nominal data type, processing continues in an operation 304. In operation 302, the input variables having the nominal data type are levelized. An input variable is levelized by mapping the original attribute values to a range of contiguous integer values. Missing attribute values are assigned a distinct integer value.

In operation 304, a determination is made concerning whether or not the target variable is of the nominal or of the ordinal data type. Data of the ordinal data type represent quantities that have a natural ordering such as a rank value. If the target variable is of the nominal or of the ordinal data type, processing continues in an operation 310. If the target variable is not of the nominal or of the ordinal data type, processing continues in an operation 306.

In operation 306, one or more blocks of contiguous data are stored columnwise for observations that do not include a missing target value. Storing data columnwise means that data stored in a column in dataset 126 is stored contiguously next to each other in the one or more blocks.

In operation 308, one or more second blocks of contiguous data are stored columnwise for observations that do include a missing target value. The number of blocks created depends on the number of observations included in the dataset and the size of each block. The size of each block may have a default value or may be user defined.

In an operation 310, a determination is made concerning whether or not the target variable is of the nominal data type. If the target variable is of the nominal data type, processing continues in an operation 312. If the target variable is not of the nominal data type, processing continues in an operation 314. In operation 312, the target variable is levelized by mapping the original attribute values to a range of contiguous integer values. A missing target attribute value is assigned a distinct integer value.

In operation 314, a determination is made concerning whether or not a target value is missing for any observation. If a target value is missing for any observation, processing continues in an operation 316. If a target value is not missing for any observation, processing continues in an operation 320.

In operation 316, one or more third blocks are created for the missing target values that are not missing an input variable attribute value. In operation 318, one or more fourth blocks are created for the missing target values that are missing an input variable attribute value. In operation 320, one or more fifth blocks are created for each non-missing target value that is not missing an input variable attribute value. In operation 322, one or more sixth blocks are created for each non-missing target value that is missing an input variable attribute value. If decision tree learning device 100 is multi-threaded, the one or more third, fourth, fifth, and sixth blocks may be distributed to different threads.

With continuing reference to FIG. 2, processing continues in operation 210. For example, table I below illustrate the plurality of blocks 128

TABLE I

| Target value 1 | Target value 2 | Target value 3 | Target value K | Missing Target value |
|---|---|---|---|---|
| N-block 1 | N-block 5 | N-block 10 | N-block 14 | N-block 19 |
| N-block 2 | N-block 6 | N-block 11 | N-block 15 | N-block 20 |
| N-block 3 | N-block 7 | M-block 12 | N-block 16 | M-block 21 |
| M-block 4 | M-block 8 | M-block 13 | N-block 17 | |
| | M-block 9 | | M-block 18 | | where N indicates not missing an input variable attribute value and M indicates missing an input variable attribute value. In this illustrative embodiment, the one or more third blocks include blocks 19 and 20; the one or more fourth blocks include block 21; the one or more fifth blocks include blocks 1, 2, 3, 5, 6, 7, 10, 11, 14, 15, 16, and 17; and the one or more sixth blocks include blocks 4, 8, 9, 12, 13, and 18.

Each of the one or more third, fourth, fifth, and sixth blocks may be formatted to include a missing flag, a number of observations value, a number of observations stored value, a number of input variables value, a next block pointer value, a previous block pointer value, a leaf number value for each observation stored in the block, a child leaf number value for each observation stored in the block, one or more weight values for each observation stored in the block, a pointer value to each variables data. Each variables contiguous data is stored columnwise.

The missing flag stored in each block of the one or more third, fourth, fifth, and sixth blocks indicates whether or not the block includes a missing input variable attribute value. For example, the missing flag may be set to indicate true for blocks 4, 8, 9, 12, 13, 18, and 21 in the illustrative embodiment.

The number of observations value stored in each block of the one or more third, fourth, fifth, and sixth blocks indicates a maximum number of observations that can be saved in each block without reallocating memory to the block. The size of each block may have a default value or may be user defined. The default number of observations value may be determined based on a number of bytes used to store the missing flag, the number of observations value, the number of observations stored value, the number of input variables value, the next block pointer value, the previous block pointer value, the leaf number value for each observation stored in the block, the child leaf number value for each observation stored in the block, the one or more weight values for each observation stored in the block, the pointer value to each variables data, the number of observations stored value and the data types of each variable associated with each observation.

The number of observations stored value stored in each block of the one or more third, fourth, fifth, and sixth blocks indicates the number of observations actually stored in each block, which is less than or equal to the number of observations value. For example, block 3 in the illustrative embodiment may not include the number of observations indicated by the number of observations value because each observation having target value 1 has been stored without needing number of observations indicated by the number of observations value. For example, if the number of observations value is 7 and there are only three remaining observations to store in block 3, the number of observations stored value is three.

The number of input variables value stored in each block of the one or more third, fourth, fifth, and sixth blocks indicates the number of the input variables examined to generate the decision tree.

The next block pointer and previous block pointer values stored in each block of the one or more third, fourth, fifth, and sixth blocks indicates the memory location of the next block and the previous block to create a doubly linked list of blocks. For example, the next block pointer value for block 1 may be a pointer to the memory location of block 2, and the previous block pointer value for block 1 is null; the next block pointer value for block 2 may be a pointer to the memory location of block 3, and the previous block pointer value for block 2 may be a pointer to the memory location of block 1; etc.

The leaf number value for each observation stored in each block of the one or more third, fourth, fifth, and sixth blocks indicates a current leaf node number assignment for the respective observation stored in the block. The leaf number value for each observation may be initialized to zero to indicate root node 701 as an initial leaf assignment. The child leaf number value for each observation stored in each block of the one or more third, fourth, fifth, and sixth blocks indicates a current child leaf node number assignment for the respective observation stored in the block. The current child leaf node number assignment provides a virtual leaf node assignment used in evaluating a potential split based on the virtual leaf node assignment. The child leaf number value for each observation may be initialized to zero to indicate root node 701 as an initial child leaf assignment.

The one or more weight values for each observation stored in each block of the one or more third, fourth, fifth, and sixth blocks indicates one or more weight values used by the decision tree learning algorithm in making a split decision metric calculation.

The pointer to each variables data stored in each block of the one or more third, fourth, fifth, and sixth blocks indicates a memory location within the block of the start of each variables contiguous columnwise data.

A map of target levels to normalized values may be stored in computer-readable medium 108. The number of variables and the variable data type also may be stored computer-readable medium 108.

In operation 210, the decision tree learning algorithm indicated in operation 204 is executed to compute a decision metric for root node 701 including all of the observations stored in the created blocks. The executed decision tree learning algorithm may be selected for execution based on the third indicator. Example decision tree learning algorithms include the ID3 tree-generation algorithm, the CHAID tree-generation algorithm, the C4.5 tree-generation algorithm, the C5.0 tree-generation algorithm, the CART tree-generation algorithm, the MARS tree-generation algorithm. By evaluating the missing flag value in each block, blocks without missing values can skip missing value tests.

In an operation 212, a variable of the one or more input variables is selected to evaluate a split on that variable. For example, a first variable of the one or more input variables is selected.

In an operation 214, a number of levels in which to split the selected variable is determined. For example, the number of levels may be defined using the fourth indicator. The number of levels may be constant or may vary, for example, based on a current depth level of the decision tree.

In an operation 216, a child leaf node assignment is proposed for the observations. For example, the number of levels is to be split into a number of leaf nodes. The number of leaf nodes is less than or equal to the number of levels in which to split the selected variable. The number of leaf nodes may be defined using the fourth indicator. The number of leaf nodes may be constant or may vary, for example, based on a current value of the number of levels in which to split the selected variable. For illustration, the number of levels may be three and the number of leaf nodes may be two. As an example, a first level for the selected input variable is assigned to a first child leaf node. A second level and a third level for the selected input variable is assigned to a second child leaf node when the number of levels is three and the number of leaf nodes is two. The child leaf number value for each observation may be reset to indicate a current proposed leaf node assignment based on an attribute value of the input variable for the observation and the level in which the attribute value falls. As understood by a person of skill in the art, as the decision tree is generated, fewer and fewer observations are evaluated at each split.

In an operation 218, the decision tree learning algorithm indicated in operation 204 is executed to compute a decision metric based on the split defined by the current child leaf node assignments. An example decision metric is an entropy value, a chi-square value, a variance value, etc. The current child leaf node assignments for each record are evaluated in each block to determine which observation(s), if any, are included for evaluation in the current proposed split.

In an operation 220, a comparison is made between the currently computed decision metric and a previous best decision metric. If the new split is valid and the currently computed decision metric has an "improved" value relative to the previous best decision metric, the current tree configuration and the currently computed decision metric are stored, for example, in computer-readable medium 108. The previous best decision metric value may be initialized to a very high value or a very low value depending on whether or not a better decision metric is based on a minimum value or a maximum value. For example, if a lower decision metric is better, the previous best decision metric may be initialized to a value much larger than an expected decision metric value; if a higher decision metric is better, the previous best decision metric may be initialized to a value much smaller than an expected decision metric value. In an illustrative embodiment, the previous best decision metric may be initialized to the threshold worth value defined in operation 206.

The currently computed decision metric and the previous best decision metric are compared to determine if the currently computed decision metric is better than the previous best decision metric. For example, if a lower decision metric is better, the currently computed decision metric is better if it is less than the previous best decision metric; if a higher decision metric is better, the currently computed decision metric is better if it is greater than the previous best decision metric. When the currently computed decision metric is better than the previous best decision metric, the split child leaf assignments are stored and the previous best decision metric is set to the currently computed decision metric and stored.

In an operation 222, the child leaf node assignments are incremented using a Gray code. The Gray code is a reflected code where two successive values differ in only one bit. One variable level can be fixed to one leaf node while the remaining levels are successively assigned to a different leaf node using the Gray code to define the next child leaf node assignment. Each possible set of assignments is iterated through in operation 222. Without loss of generality, one variable level can be assigned to one child leaf node. The next child leaf node can switch between that leaf node and another leaf node; the next child leaf node can switch between three leaf nodes, etc. The child leaf node assignments are equivalent to an I-digit number with a per-digit basis of between 1 and the number of leaf nodes. The I-digit number is incremented using a variable-base Gray code. The current I-digit number defines the current assignments and may be initialized to 0 (the first leaf). Additionally, a second I-digit number may be used to track the base of each digit to identify invalid leaf assignments.

An example four-level (number of levels) maxbase-3 (number of leaf nodes) Gray code sequence may be defined as indicated in table II below in an illustrative embodiment where the second I-digit number is 1233 to indicate the first level has one valid value (i.e., 0), the second level has two valid values (i.e., 0 and 1), the third level has three valid values (i.e., 0, 1, and 2), and the fourth level has three valid values (i.e., 0, 1, and 2):

TABLE II

| I-digit number value | Valid? |
|---|---|
| 0000 | Y |
| 0001 | Y |
| 0002 | N |
| 0012 | Y |
| 0011 | Y |
| 0010 | Y |
| 0020 | N |
| 0021 | Y |
| 0022 | N |
| 0122 | Y |
| 0121 | Y |
| 0120 | Y |
| 0110 | Y |
| 0111 | Y |
| 0112 | Y |
| 0102 | Y |
| 0101 | Y |
| 0100 | Y |

In operation 224, a determination is made concerning whether or not the incremented child leaf node assignment is valid. For example, the I-digit number values of 0002, 0020, and 0022 are invalid because they are not in canonical form.

For example, when creating up to a 3-way split, there may be three leaves: 0 1 2 to assign to a 3-level variable (A B C). A can be assigned to leaf 0 and B can be assigned to either 0 or 1 without loss of generality. C can be assigned to 0, 1, or 2 equally well. Starting with a 0 split and ignoring the canonicality rule results in the splits below:

| Configuration | A | B | C |
|---|---|---|---|
| {ABC} {} {} | 0 | 0 | 0 |
| {AB} {C} {} | 0 | 0 | 1 |
| {AB} {} {C} | 0 | 0 | 2 |
| {A} {B} {C} | 0 | 1 | 2 |
| {A} {BC} {} | 0 | 1 | 1 |
| {AC} {B} {} | 0 | 1 | 0 |

However, there is no difference between the second and third lines above, which the canonicality rule resolves by determining that the second line is the only line allowed as between the second and third lines.

If the incremented child leaf node assignment is valid, processing continues in an operation 226. If the incremented child leaf node assignment is invalid, processing continues in operation 222 to increment to a next I-digit number using the Gray code.

In operation 226, a determination is made concerning whether or not the complete Gray code sequence has been processed. For example, after the I-digit number having the value of 0100 is processed, the Gray code sequence is complete. If the complete Gray code sequence has been processed, processing continues in an operation 228. If the complete Gray code sequence has not been processed, processing continues in operation 216 to make the next child leaf node assignments proposed for the observations by the incremented I-digit number.

Because the increment operation only changes one digit (e.g. one child leaf node assignment) at a time, the operations to compute the decision metric for the next child leaf node assignments is minimized, particularly if the decision metric computation is appropriately separable (for instance, if it is simply a sum or product over the respective leaves).

In operation 228, a determination is made concerning whether or not another input variable is to be evaluated for the current virtual split. For example, the input variables are each evaluated for each virtual split. In an alternative embodiment, only those input variables not already used to define an actual split are evaluated for the current virtual split. If another input variable is to be evaluated, processing continues in operation 212 to select the next input variable. If the input variables have been evaluated, processing continues in an operation 230.

Because only one split is evaluated at a time, child leaf assignment updates involve only one input variable (the variable used in the chosen split). Observation data does not need to be traced down the entire decision tree, only the observations corresponding to the chosen split. Further, as the decision tree grows, fewer observations are re-assigned and more observations are skipped within each block.

In operation 230, a determination is made concerning whether or not a virtual split was defined in operations 214 to 228. If a virtual split was defined, processing continues in an operation 232. If a virtual split was not defined, processing continues in an operation 234. A split may not be found, for example, if the previous best decision metric equals the threshold worth value indicating that a better decision metric value was not computed for any of the proposed child leaf assignments.

In operation 232, the blocks are updated to reset the leaf assignment value to the child leaf node assignment stored in operation 220 for those observations involved in the split. Operation 232 converts the "virtual" split to an actual split by updating the leaf assignment value. First, the nodes corresponding to the split leaf are re-assigned to the new leaves using the leaf assignment. Second, since the new virtual splits are recomputed, all records are given a child leaf node assignment. The child leaf node assignment is the new child leaf number the record corresponds to or is a special mask value that indicates the record was not re-assigned and therefore does not participate in the virtual split creations. After the records are reassigned, the per-variable-level-and-target counts may be recalculated for the new leaves based on the child leaf node assignment. The special mask value indicates the record can be skipped because the record was not reassigned.

As understood by a person of skill in the art and referring to FIG. 7, only those observations in the split based on first internal node A 702a are evaluated for the split between second leaf node B 704b and third internal node C 702c. Referring again to FIG. 2, processing continues in operation 212 to select a next variable for evaluation of a next possible split. For illustration and again referring to FIG. 7, a next split may be evaluated for second leaf node B 704b using a variable not used in the split at first internal node A 702a and at second leaf node B 704b. Processing continues until each created node is evaluated for a split.

Again referring to FIG. 2, in an operation 234, the characteristics of the generated decision tree are output. For illustration and again referring to FIG. 7, information defining the plurality of nodes defined in decision tree 700 is output to computer-readable medium 108, to display 118, and/or to printer 122, etc.

Decision tree generation may be performed using a single computing device such as decision tree learning device 100. Alternatively, decision tree generation may be performed using a plurality of networked computing devices. For example, referring to FIG. 4, a block diagram of a decision tree learning system 400 is shown in accordance with an illustrative embodiment. In an illustrative embodiment, decision tree learning system 400 may include decision tree learning device 100, grid systems 130, data access systems 132, and a network 402. One or more components of decision tree learning system 400 may support multithreading, as understood by a person of skill in the art. In an alternative embodiment, decision tree learning system 400 does not include data access systems 132.

The components of decision tree learning system 400 may be located in a single room or adjacent rooms, in a single facility, and/or may be distributed geographically from one another. Each of grid systems 130, data access systems 132, and decision tree learning device 100 may be composed of one or more discrete devices.

Network 402 may include one or more networks of the same or different types. Network 402 can be any type of wired and/or wireless public or private network including a cellular network, a local area network, a wide area network such as the Internet, etc. Network 402 further may comprise sub-networks and consist of any number of devices.

Data access systems 132 can include any number and type of computing devices that may be organized into subnets. The computing devices of data access systems 132 send and receive communications through network 402 to/from decision tree learning device 100. The one or more computing devices of data access systems 132 may include computers of any form factor such as a smart phone 404, a desktop 406, a laptop 408, a personal digital assistant, an integrated messaging device, a tablet computer, etc. The one or more computing devices of data access systems 132 may communicate using various transmission media that may be wired and/or wireless as understood by those skilled in the art.

Figure 4:
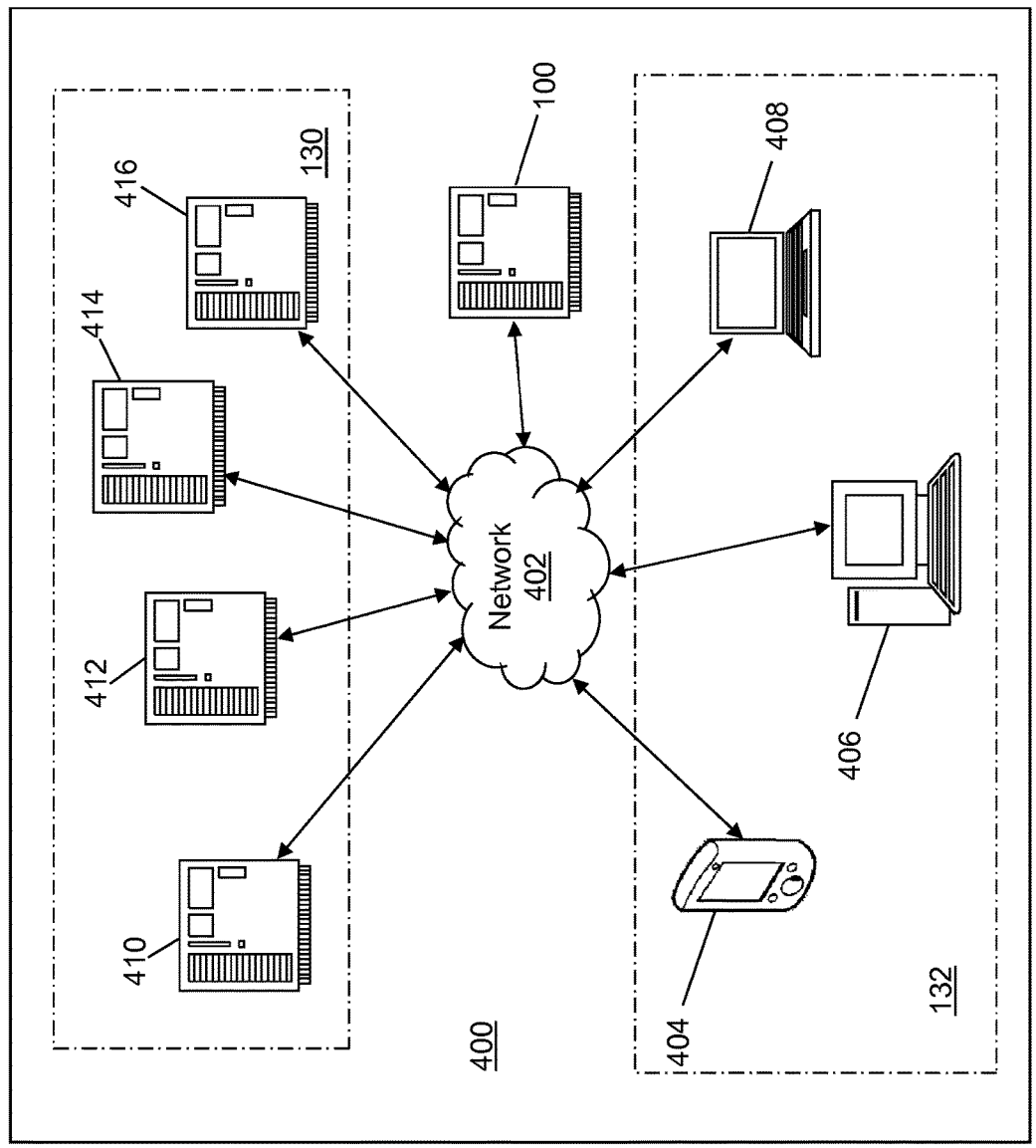
FIG. 4 depicts a block diagram with an example of a decision tree learning system in accordance with an illustrative embodiment.

For illustration, FIG. 4 represents grid systems 130 with a first server computer 410, a second server computer 412, a third server computer 414, and a fourth server computer 416. Grid systems 130 can include any number and form factor of computing devices that may be organized into subnets. The computing devices of grid systems 130 send and receive communications through network 402 to/from another of the one or more computing devices of grid systems 130 and/or to/from decision tree learning device 100. The one or more computing devices of grid systems 130 may communicate using various transmission media that may be wired and/or wireless as understood by those skilled in the art.

In the illustrative embodiment, decision tree learning device 100 is represented as a server computing device though decision tree learning device 100 may include one or more computing devices of any form factor that may be organized into one or more subnets. Decision tree learning device 100 sends and receives communications through network 402 to/from grid systems 130 and/or to/from data access systems 132. Decision tree learning device 100 may communicate using various transmission media that may be wired and/or wireless as understood by those skilled in the art.

Decision tree learning device 100 and grid systems 130 may be implemented as a multi-node Hadoop® cluster, as understood by a person of skill in the art. Apache™ Hadoop® is an open-source software framework for distributed computing. Other methods of supporting distributed computing may be used to coordinate the computations between decision tree learning device 100 and grid systems 130 as understood by a person of skill in the art.

Figure 5:
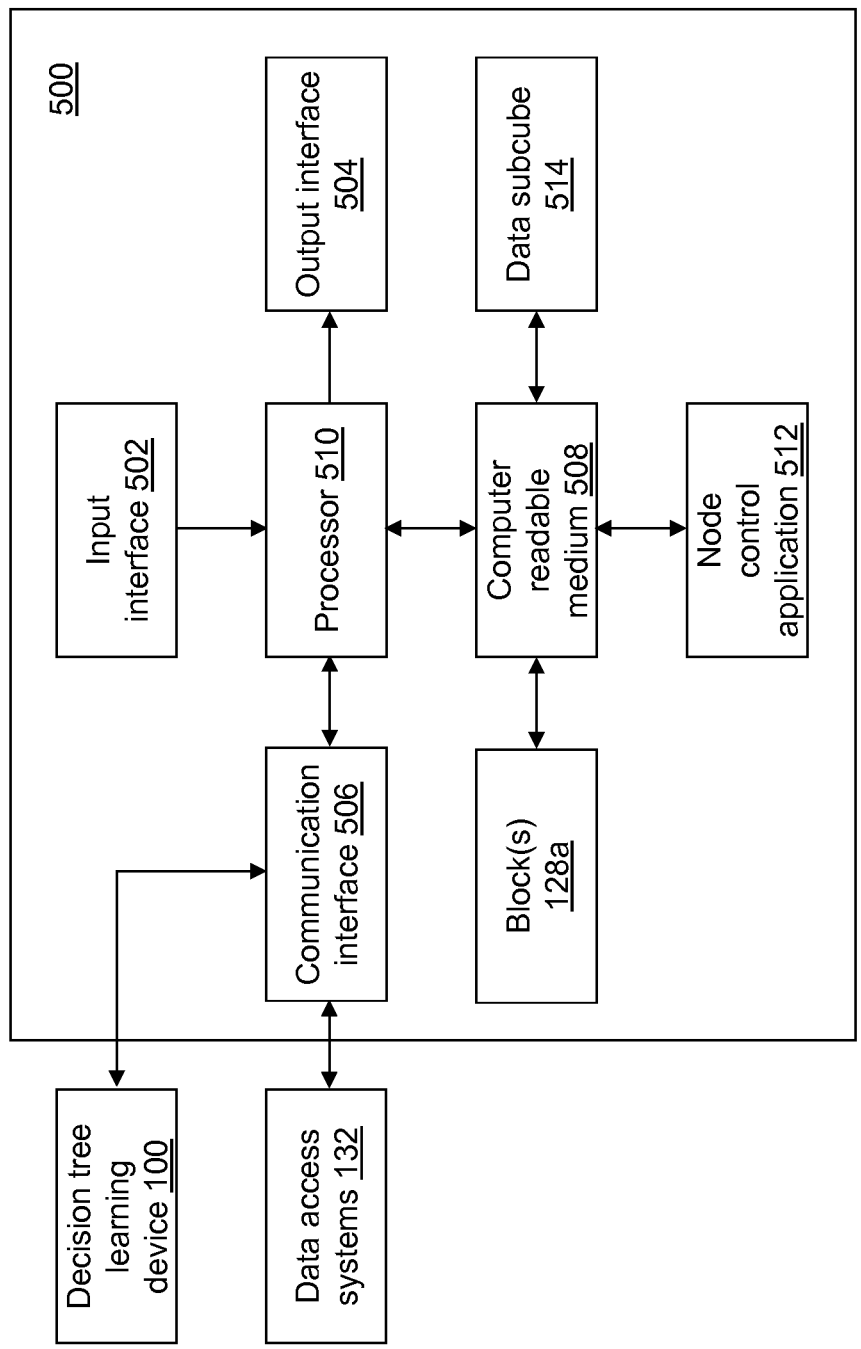
FIG. 5 depicts a block diagram of a grid node device of the decision tree learning system of FIG. 4 in accordance with an illustrative embodiment.

Referring to FIG. 5, a block diagram of a grid node device 500 is shown in accordance with an example embodiment. Grid node device 500 is an example computing device of grid systems 130. Grid node device 500 may include a second input interface 502, a second output interface 504, a second communication interface 506, a second computer-readable medium 508, a second processor 510, a node control application 512, a data subcube 514, and a second plurality of blocks 128*a*. Fewer, different, and additional components may be incorporated into grid node device 500.

Data subcube 514 stores a portion of dataset 126 distributed across grid systems 130 with each computing device of the grid systems 130 storing a different portion of dataset 126. Decision tree learning device 100 further may store a portion of dataset 126. The second plurality of blocks 128*a* are created from all or a portion of data subcube 514, for example, as discussed with reference to FIG. 10. In an illustrative embodiment, data subcube 514 may be stored in a ROM type memory, and the second plurality of blocks 128*a* may be stored in a RAM type memory.

Second input interface 502 provides the same or similar functionality as that described with reference to input interface 102 of decision tree learning device 100 though referring to grid node device 500. Second output interface 504 provides the same or similar functionality as that described with reference to output interface 104 of decision tree learning device 100 though referring to grid node device 500. Second communication interface 506 provides the same or similar functionality as that described with reference to communication interface 106 of decision tree learning device 100 though referring to grid node device 500. Data and messages may be transferred between grid node device 500 and decision tree learning device 100 and/or data access systems 132 using second communication interface 506. Second computer-readable medium 508 provides the same or similar functionality as that described with reference to computer-readable medium 108 of decision tree learning device 100 though referring to grid node device 500. Second processor 510 provides the same or similar functionality as that described with reference to processor 110 of decision tree learning device 100 though referring to grid node device 500.

Some or all of the operations described herein may be embodied in node control application 512. The operations may be implemented using hardware, firmware, software, or any combination of these methods. Referring to the example embodiment of FIG. 5, node control application 512 is implemented in software (comprised of computer-readable and/or computer-executable instructions) stored in second computer-readable medium 508 and accessible by second processor 422 for execution of the instructions that embody the operations of node control application 512. Node control application 512 may be written using one or more programming languages, assembly languages, scripting languages, etc. Node control application 512 may be implemented as a Web application.

Figure 6:
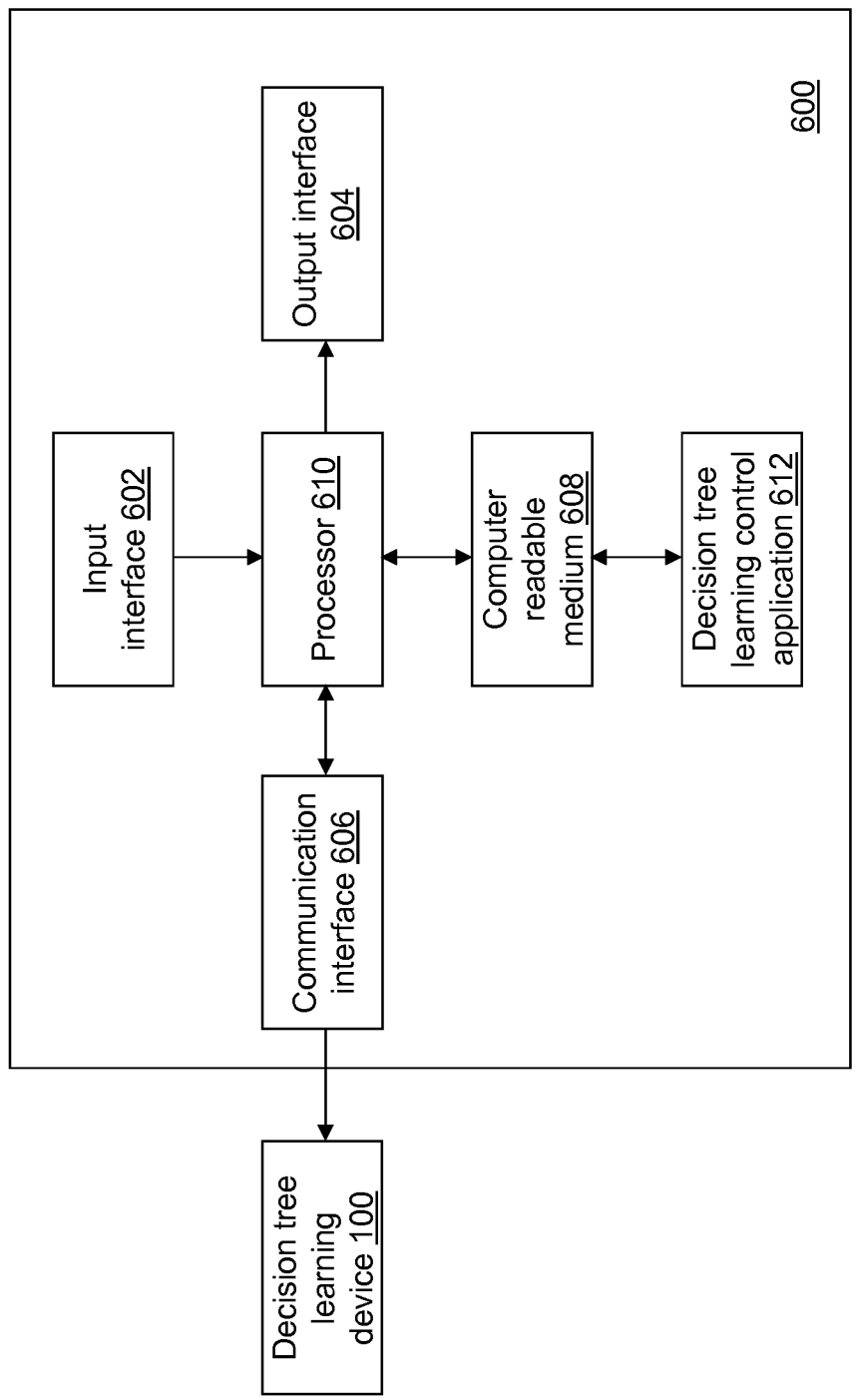
FIG. 6 depicts a block diagram of a data access device of the decision tree learning system of FIG. 4 in accordance with an illustrative embodiment.

Referring to FIG. 6, a block diagram of a data access device 600 is shown in accordance with an example embodiment. Data access device 600 is an example computing device of data access systems 132. Data access device 600 may include a third input interface 602, a third output interface 604, a third communication interface 606, a third computer-readable medium 608, a third processor 610, and a decision tree learning control application 612. Fewer, different, and additional components may be incorporated into data access device 600.

Third input interface 602 provides the same or similar functionality as that described with reference to input interface 102 of decision tree learning device 100 though referring to data access device 600. Third output interface 604 provides the same or similar functionality as that described with reference to output interface 104 of decision tree learning device 100 though referring to data access device 600. Third communication interface 606 provides the same or similar functionality as that described with reference to communication interface 106 of decision tree learning device 100 though referring to data access device 600. Data and messages may be transferred between data access device 600 and decision tree learning device 100 using third communication interface 606. Third computer-readable medium 608 provides the same or similar functionality as that described with reference to computer-readable medium 108 of decision tree learning device 100 though referring to data access device 600. Third processor 610 provides the same or similar functionality as that described with reference to processor 110 of decision tree learning device 100 though referring to data access device 600.

Decision tree learning control application 612 performs operations associated with identifying the data to be modeled using decision tree learning application 124 and/or with controlling parameters for generation of the decision tree by decision tree learning application 124. Some or all of the operations described herein may be embodied in decision tree learning control application 612. The operations may be implemented using hardware, firmware, software, or any combination of these methods. Referring to the example embodiment of FIG. 6, decision tree learning control application 612 is implemented in software (comprised of computer-readable and/or computer-executable instructions) stored in third computer-readable medium 608 and accessible by third processor 610 for execution of the instructions that embody the operations of decision tree learning control application 612. Decision tree learning control application 612 may be written using one or more programming languages, assembly languages, scripting languages, etc. Decision tree learning control application 612 may be implemented as a Web application.

Figure 8:
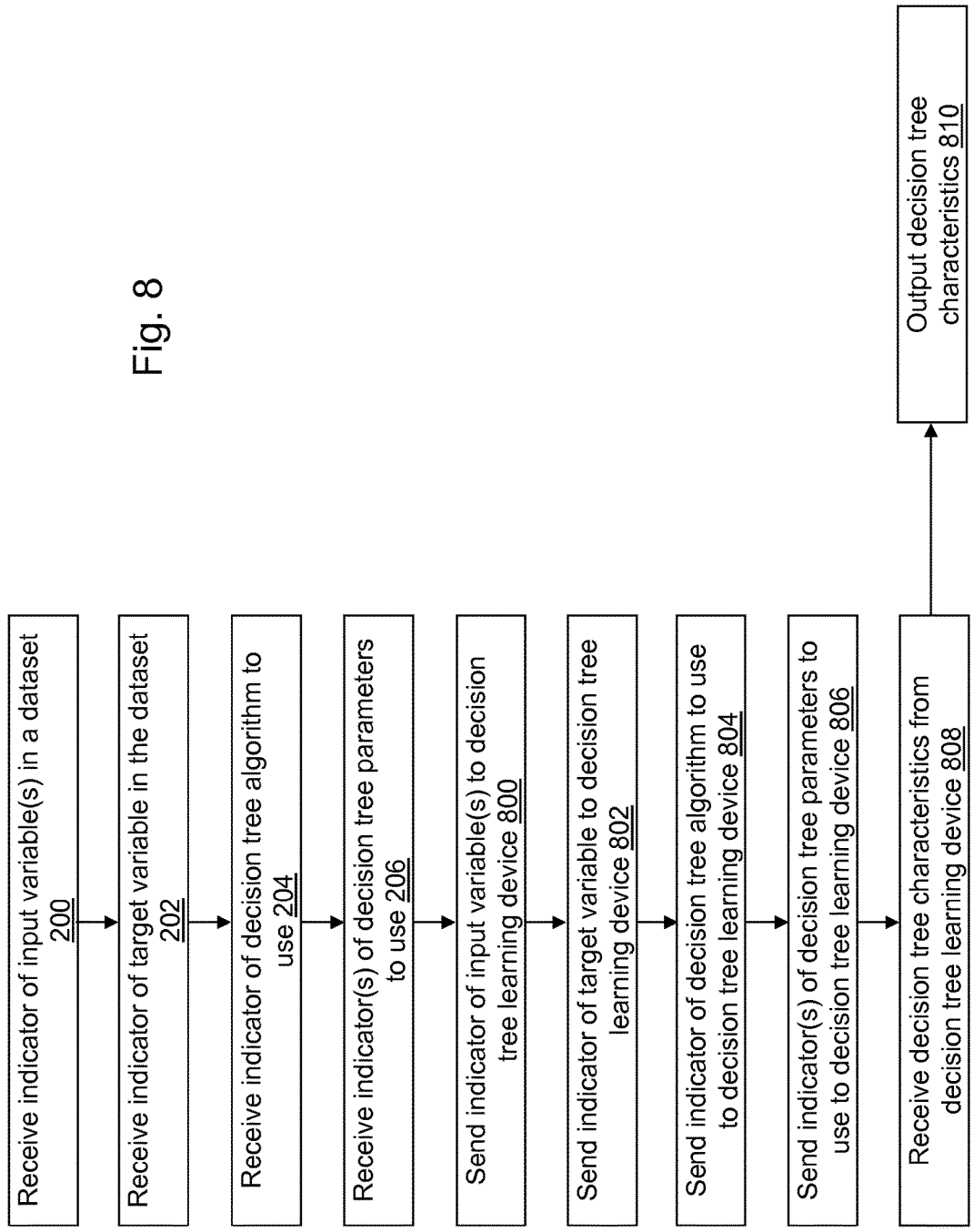
FIG. 8 depicts a flow diagram illustrating examples of operations performed by the data access device of FIG. 6 in accordance with an illustrative embodiment.

Referring to FIG. 8, example operations associated with decision tree learning control application 612 are described. Additional, fewer, or different operations may be performed depending on the embodiment. The order of presentation of the operations of FIG. 8 is not intended to be limiting. Although some of the operational flows are presented in sequence, the various operations may be performed in various repetitions, concurrently (in parallel, for example, using threads), and/or in other orders than those that are illustrated. For example, a user may execute decision tree learning control application 612, which causes presentation of a first user interface window, which may include a plurality of menus and selectors such as drop down menus, buttons, text boxes, hyperlinks, etc. associated with decision tree learning control application 612 as understood by a person of skill in the art.

Decision tree learning control application 612 includes operations 200, 202, 204, and 206. In an operation 800, the first indicator is sent to decision tree learning device 100. In an operation 802, the second indicator is sent to decision tree learning device 100. In an operation 804, the third indicator is sent to decision tree learning device 100. In an operation 806, the fourth indicator is sent to decision tree learning device 100.

In an operation 808, the generated decision tree characteristics are received from decision tree learning device 100. Similar to operation 234, in an operation 810, generated decision tree characteristics may be output to computer-readable medium 608, to a second display, and/or to a second printer, etc.

Decision tree learning application 124 may further perform operations associated with distributing the data stored in dataset 126 into the data subcubes stored at a plurality of computing devices (grid nodes) of grid systems 130. For illustration, one or more rows of dataset 126 are stored to each grid node of grid systems 130. Creation of the data subcubes at each grid node of grid systems 130 may precede execution of decision tree learning application 124 and/or decision tree learning control application 612 or may be initiated by execution of decision tree learning application 124 and/or decision tree learning control application 612.

Figure 9:
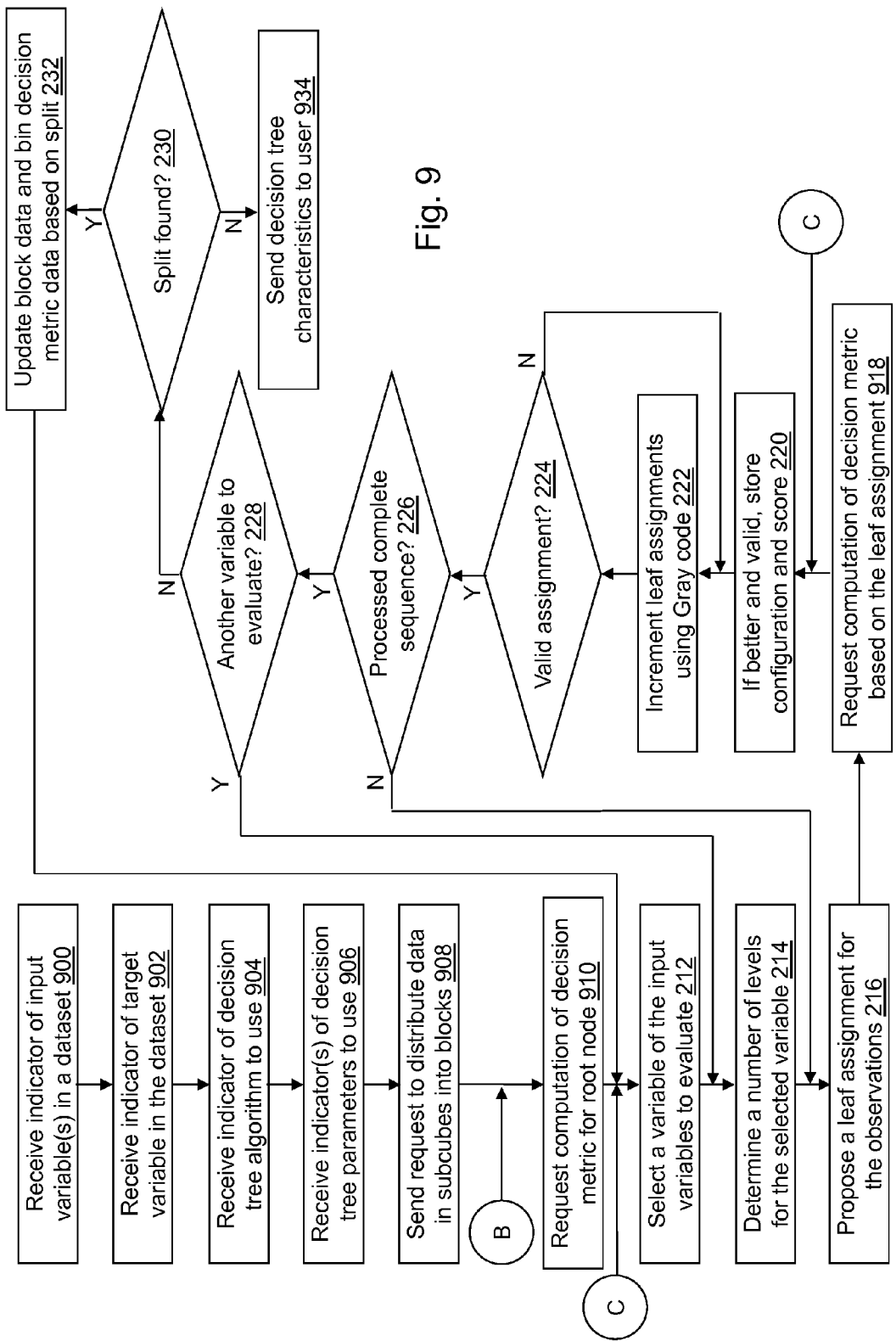
FIG. 9 depicts a flow diagram illustrating further examples of operations performed by the decision tree learning device of FIG. 1 in accordance with an illustrative embodiment.

Referring to FIG. 9, further example operations associated with decision tree learning application 124 are described. Additional, fewer, or different operations may be performed depending on the embodiment. The order of presentation of the operations of FIG. 9 is not intended to be limiting. Although some of the operational flows are presented in sequence, the various operations may be performed in various repetitions, concurrently (in parallel, for example, using threads), and/or in other orders than those that are illustrated.

In an operation 900, the first indicator is received from data access device 600. In an operation 902, the second indicator is received from data access device 600. In an operation 904, the third indicator is received from data access device 600. In an operation 906, the fourth indicator is received from data access device 600.

Figure 10A:
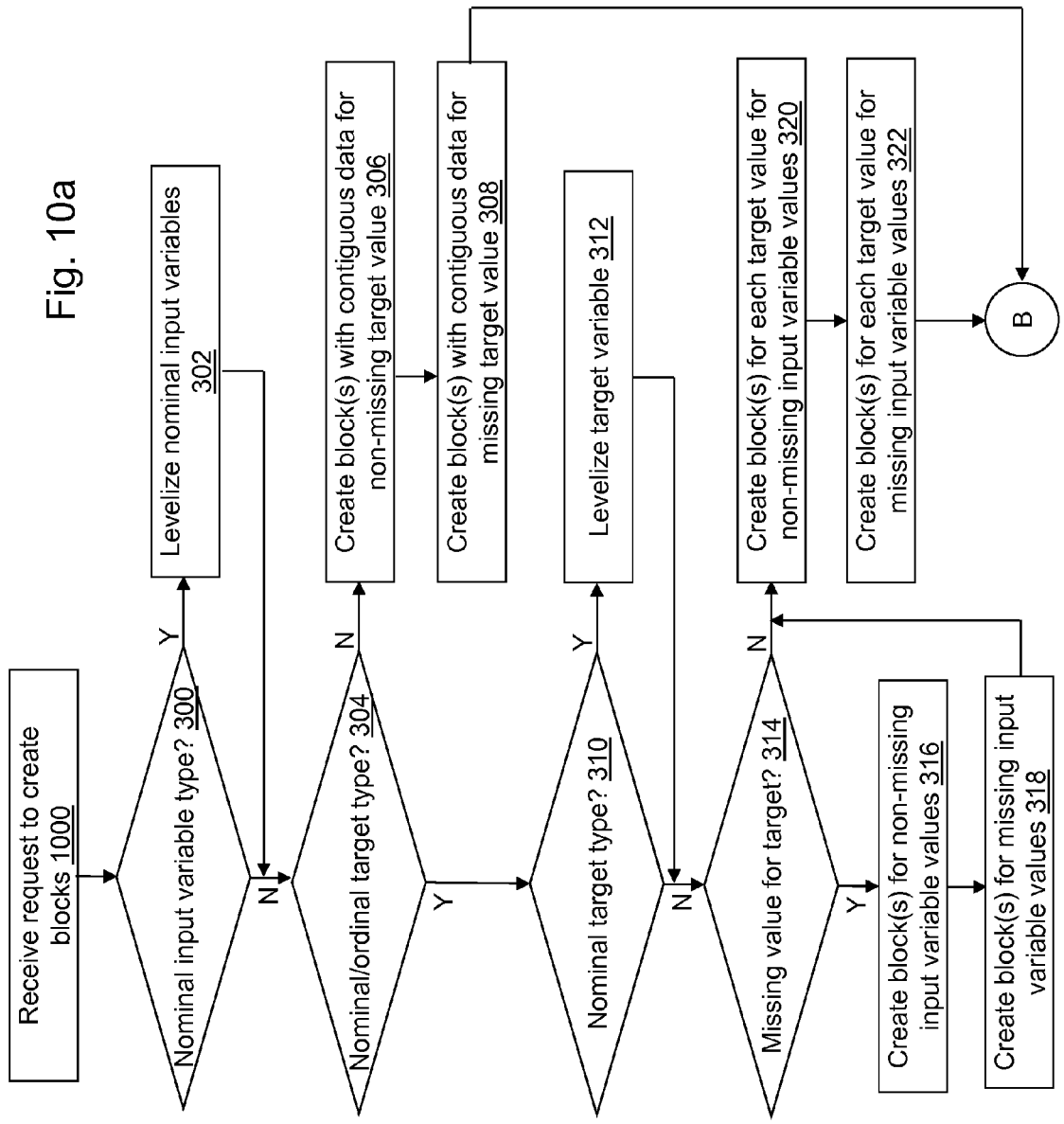
FIGS. 10a and 10b depict a flow diagram illustrating examples of operations performed by the grid node device of FIG. 5 in accordance with an illustrative embodiment.

In operation 908, decision tree learning device 100 sends a request to the grid nodes of grid systems 130 to each distribute the data subcube at the respective grid node device into blocks as described previously. For example, referring to FIG. 10a, example operations associated with node control application 512 are described to distribute the data subcube at the respective grid node device into blocks. Additional, fewer, or different operations may be performed depending on the embodiment. The order of presentation of the operations of FIG. 10a is not intended to be limiting. Although some of the operational flows are presented in sequence, the various operations may be performed in various repetitions, concurrently (in parallel, for example, using threads), and/or in other orders than those that are illustrated.

In an operation 1000, a request to distribute data subcube 514 into the second plurality of blocks 128a at each grid node of grid systems 130 is received. Node control application 512 executing at each grid node of grid systems 130 performs operations 300 to 322 to create the second plurality of blocks 128a at the respective grid node.

Figure 10B:
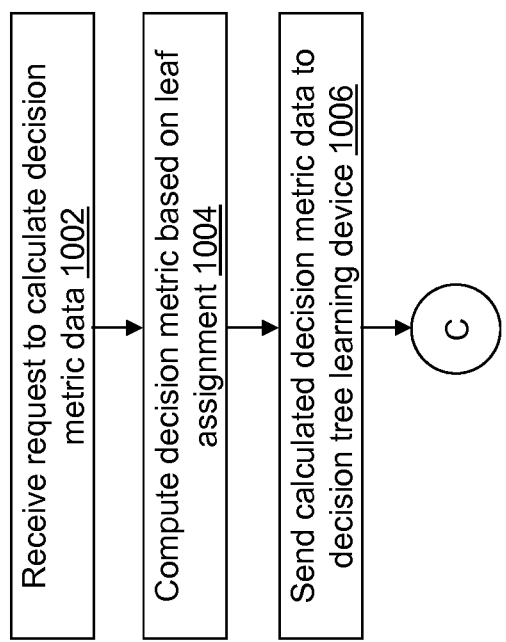

Referring to FIG. 9, in an operation 910, decision tree learning device 100 sends a request to the grid nodes of grid systems 130 to each compute a decision metric value for the second plurality of blocks 128a assigned to root node 701. For example, referring to FIG. 10b, further example operations associated with node control application 512 are described compute the decision metric value for the second plurality of blocks 128a at the respective grid node device. Additional, fewer, or different operations may be performed depending on the embodiment. The order of presentation of the operations of FIG. 10b is not intended to be limiting. Although some of the operational flows are presented in sequence, the various operations may be performed in various repetitions, concurrently (in parallel, for example, using threads), and/or in other orders than those that are illustrated.

In an operation 1002, a request to compute the decision metric for the second plurality of blocks 128a is received at each grid node of grid systems 130. Similar to operation 210, in an operation 1004, node control application 512 executing at each grid node of grid systems 130 computes the decision metric for the second plurality of blocks 128a. In an operation 1006, the computed decision metric is sent to decision tree learning device 100.

Referring again to FIG. 9, decision tree learning application 124 receives the decision metric from each grid node of grid systems 130 and performs operations 212, 214, and 216. In an operation 918, a request to compute the decision metric for the second plurality of blocks 128a based on the proposed child leaf assignments is sent to each grid node of grid systems 130. Decision tree learning application 124 receives the decision metric from each grid node of grid systems 130 and performs operations 220 to 232. In operation 934, the decision tree characteristics are sent to data access device 600.

Distributed execution of the operations of FIGS. 8, 9, 10a, and 10b may be performed using grid systems 130 in other ways than those described. Various levels of integration between the components of decision tree learning system 400 may be implemented without limitation as understood by a person of skill in the art.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, using "and" or "or" is intended to include "and/or" unless specifically indicated otherwise. The illustrative embodiments may be implemented as a method, apparatus, or article of manufacture using standard programming and/or engineering techniques to produce software, firmware, hardware, or any combination thereof to control a computer to implement the disclosed embodiments.

Some systems may use Hadoop®, an open-source framework for storing and analyzing big data in a distributed computing environment. Some systems may use cloud computing, which can enable ubiquitous, convenient, on-demand network access to a shared pool of configurable computing resources (e.g., networks, servers, storage, applications and services) that can be rapidly provisioned and released with minimal management effort or service provider interaction. Some grid systems may be implemented as a multi-node Hadoop® cluster, as understood by a person of skill in the art. Apache™ Hadoop® is an open-source software framework for distributed computing. Some systems may use the SAS® LASR™ Analytic Server in order to deliver statistical modeling and machine learning capabilities in a highly interactive programming environment, which may enable multiple users to concurrently manage data, transform variables, perform exploratory analysis, build and compare models and score. Some systems may use SAS In-Memory Statistics for Hadoop® to read big data once and analyze it several times by persisting it in-memory for the entire session. Some systems may be of other types and configurations.

The foregoing description of illustrative embodiments of the disclosed subject matter has been presented for purposes of illustration and of description. It is not intended to be exhaustive or to limit the disclosed subject matter to the precise form disclosed, and modifications and variations are possible in light of the above teachings or may be acquired from practice of the disclosed subject matter. The embodiments were chosen and described in order to explain the principles of the disclosed subject matter and as practical applications of the disclosed subject matter to enable one skilled in the art to utilize the disclosed subject matter in various embodiments and with various modifications as suited to the particular use contemplated.

What is claimed is:

1. A non-transitory computer-readable medium having stored thereon computer-readable instructions that when executed by a computing device cause the computing device to:
receive an indicator of a dataset, wherein the dataset includes a target variable and a plurality of input variables;
(a) receive a target indicator of the target variable to evaluate from the dataset;
(b) receive an input indicator of an input variable of the plurality of input variables to evaluate from the dataset, wherein the dataset includes a plurality of values for the input variable and a plurality of target values for the target variable, wherein a value for the input variable is associated with a target value for the target variable;
(c) determine a number of levels of the input variable to evaluate;
(d) define a level value for each of the determined number of levels based on the plurality of values of the input variable;
(e) assign the plurality of values of the input variable to a level of the determined number of levels based on the defined level value;
(f) identify a maximum number of leaves of a plurality of leaves to evaluate, wherein the identified maximum number of leaves is less than or equal to the determined number of levels;
(g) define a leaf assignment value for each level of the determined number of levels, wherein the leaf assignment value is less than or equal to the identified maximum number of leaves;
(h) compute a decision metric for splitting data in the dataset based on the defined leaf assignment value and the assigned plurality of values of the input variable;
(i) store the defined leaf assignment value and the computed decision metric;
(j) increment a leaf assignment of the determined number of levels using a Gray code to define the leaf assignment value for each level of the determined number of levels, wherein the leaf assignment value for each level varies between zero and the identified maximum number of leaves;
(k) repeat (h) to (j) for each valid Gray code value;
(l) select a best leaf assignment for the plurality of values of the input variable and the plurality of target values of the target variable based on the computed decision metric;
output the selected best leaf assignment as a node of a decision tree;
receive a second indicator of a second dataset, wherein the second dataset includes a second value for the input variable; and
predict a target value for the target variable, at least partially, by applying the second value for the input variable to the node of the output decision tree.

2. The computer-readable medium of claim 1, wherein the decision metric is computed using a statistical equation.

3. The computer-readable medium of claim 1, wherein the defined leaf assignment and the computed decision metric are stored when the computed decision metric is better than a previous best decision metric.

4. The computer-readable medium of claim 3, wherein the computed decision metric is better than the previous best decision metric when the computed decision metric is less than the previous best decision metric.

5. The computer-readable medium of claim 3, wherein the computed decision metric is better than the previous best decision metric when the computed decision metric is greater than the previous best decision metric.

6. The computer-readable medium of claim 1, wherein, after (j) and before (k), the computer-readable instructions further cause the computing device to determine whether or not to skip the incremented leaf assignment of the determined number of levels; and to repeat (j) when the determination is to skip the incremented leaf assignment of the determined number of levels.

7. The computer-readable medium of claim 1, wherein the Gray code is implemented as a mirroring, variable-base Gray code.

8. The computer-readable medium of claim 1, wherein the variable-base of the Gray code is the identified maximum number of leaves.

9. The computer-readable medium of claim 1, wherein, after (k), the computer-readable instructions further cause the computing device to repeat (b) to (k) with a second input variable as the input variable to evaluate from the dataset.

10. The computer-readable medium of claim 1, wherein, after (l), the computer-readable instructions further cause the computing device to assign the plurality of values of the input variable and the respective plurality of target values of the target variable to a leaf of the plurality of leaves based on the selected best leaf assignment.

11. The computer-readable medium of claim 10, wherein the plurality of values of the input variable and the respective plurality of target values of the target variable are assigned when the computed decision metric associated with the selected best leaf assignment satisfies a criterion.

12. The computer-readable medium of claim 10, wherein, before (g), the computer-readable instructions further cause the computing device to distribute the plurality of values of the input variable and the respective plurality of target values of the target variable into memory blocks of the computer-readable medium.

13. The computer-readable medium of claim 12, wherein the memory blocks include a child leaf value that indicates the leaf assignment value for each iteration of (j).

14. The computer-readable medium of claim 13, wherein assigning the plurality of values of the input variable and the respective plurality of target values of the target variable to the leaf comprises updating the memory blocks to include a new leaf indicator equal to the child leaf value for the selected best leaf assignment.

15. The computer-readable medium of claim 12, wherein a memory block is created for each distinct value of the plurality of target values of the target variable when the target variable is represented by a nominal value or an ordinal value.

16. The computer-readable medium of claim 12, wherein each memory block of the memory blocks includes a pointer to a next memory block to form a linked list.

17. The computer-readable medium of claim 12, wherein each memory block of the memory blocks includes the plurality of values of the input variable associated with a respective distinct value of the plurality of target values stored contiguously into the memory block.

18. The computer-readable medium of claim 12, wherein each memory block of the memory blocks includes a missing flag that indicates whether or not a respective memory block includes an input variable having a missing value.

19. The computer-readable medium of claim 12, wherein each memory block of the memory blocks includes a numerical value indicating a number of input variables stored in the memory block.

20. A system comprising:
a processor; and
a computer-readable medium operably coupled to the processor, the computer-readable medium having computer-readable instructions stored thereon that, when executed by the processor, cause the computing device to
receive an indicator of a dataset, wherein the dataset includes a target variable and a plurality of input variables;
(a) receive a target indicator of the target variable to evaluate from the dataset;
(b) receive an input indicator of an input variable of the plurality of input variables to evaluate from the dataset, wherein the dataset includes a plurality of values for the input variable and a plurality of target values for the target variable, wherein a value for the input variable is associated with a target value for the target variable;
(c) determine a number of levels of the input variable to evaluate;
(d) define a level value for each of the determined number of levels based on the plurality of values of the input variable;
(e) assign the plurality of values of the input variable to a level of the determined number of levels based on the defined level value;
(f) identify a maximum number of leaves of a plurality of leaves to evaluate, wherein the identified maximum number of leaves is less than or equal to the determined number of levels;
(g) define a leaf assignment value for each level of the determined number of levels, wherein the leaf assignment value is less than or equal to the identified maximum number of leaves;
(h) compute a decision metric for splitting data in the dataset based on the defined leaf assignment value and the assigned plurality of values of the input variable;
(i) store the defined leaf assignment value and the computed decision metric;
(j) increment a leaf assignment of the determined number of levels using a Gray code to define the leaf assignment value for each level of the determined number of levels, wherein the leaf assignment value for each level varies between zero and the identified maximum number of leaves;
(k) repeat (h) to (j) for each leaf assignment possibility of the determined number of levels;
(l) select a best leaf assignment for the plurality of values of the input variable and the plurality of target values of the target variable based on the computed decision metric;
output the selected best leaf assignment as a node of a decision tree;
receive a second indicator of a second dataset, wherein the second dataset includes a second value for the input variable; and
predict a target value for the target variable, at least partially, by applying the second value for the input variable to the node of the output decision tree.

21. A method of generating a decision tree, the method comprising:
receiving, by a computing device, an indicator of a dataset, wherein the dataset includes a target variable and a plurality of input variables;
(a) receiving, by the computing device, the target variable to evaluate from the dataset;
(b) receiving, by the computing device, an input indicator of an input variable of the plurality of input variables to evaluate from the dataset, wherein the dataset includes a plurality of values for the input variable and a plurality of target values for the target variable, wherein a value for the input variable is associated with a target value for the target variable;
(c) determining, by the computing device, a number of levels of the input variable to evaluate;
(d) defining, by the computing device, a level value for each of the determined number of levels based on the plurality of values of the input variable;
(e) assigning, by the computing device, the plurality of values of the input variable to a level of the determined number of levels based on the defined level value;
(f) identifying, by the computing device, a maximum number of leaves of a plurality of leaves to evaluate, wherein the identified maximum number of leaves is less than or equal to the determined number of levels;
(g) defining, by the computing device, a leaf assignment value for each level of the determined number of levels, wherein the leaf assignment value is less than or equal to the identified maximum number of leaves;
(h) computing, by the computing device, a decision metric for splitting the data in the dataset based on the defined leaf assignment and the assigned plurality of values of the input variable;
(i) storing, by the computing device, the defined leaf assignment and the computed decision metric;
(j) incrementing, by the computing device, a leaf assignment of the determined number of levels using a Gray code to define the leaf assignment value for each level of the determined number of levels, wherein the leaf assignment value for each level varies between zero and the identified maximum number of leaves;
(k) repeating, by the computing device, (h) to (j) for each leaf assignment possibility of the determined number of levels;
(l) selecting, by the computing device, a best leaf assignment for the plurality of values of the input variable and the plurality of target values of the target variable based on the computed decision metric;
outputting, by the computing device, the selected best leaf assignment as a node of a decision tree;
receiving, by the computing device, a second indicator of a second dataset, wherein the second dataset includes a second value for the input variable; and predicting, by the computing device, a target value for the target variable, at least partially, by applying the second value for the input variable to the node of the output decision tree.

22. The system of claim 20, wherein the Gray code is implemented as a mirroring, variable-base Gray code.

23. The system of claim 20, wherein the variable-base of the Gray code is the identified maximum number of leaves.

24. The system of claim 20, wherein, after (k), the computer-readable instructions further cause the computing device to repeat (b) to (k) with a second input variable as the input variable to evaluate from the dataset.

25. The system of claim 20, wherein, after (l), the computer-readable instructions further cause the computing device to assign the plurality of values of the input variable and the respective plurality of target values of the target variable to a leaf of the plurality of leaves based on the selected best leaf assignment.

26. The method of claim 21, wherein the Gray code is implemented as a mirroring, variable-base Gray code.

27. The method of claim 21, wherein the variable-base of the Gray code is the identified maximum number of leaves.

28. The method of claim 21, wherein, after (k), the method further comprises repeating, by the computing device, (b) to (k) with a second input variable as the input variable to evaluate from the dataset.

29. The method of claim 21, wherein, after (l), the method further comprises assigning, by the computing device, the plurality of values of the input variable and the respective plurality of target values of the target variable to a leaf of the plurality of leaves based on the selected best leaf assignment.

30. The method of claim 29, wherein the plurality of values of the input variable and the respective plurality of target values of the target variable are assigned when the computed decision metric associated with the selected best leaf assignment satisfies a criterion.

\* \* \* \* \*